United States Patent
Koike et al.

(10) Patent No.: US 7,732,101 B2
(45) Date of Patent: Jun. 8, 2010

(54) METHOD OF PRODUCING A GLASS SUBSTRATE FOR A MASK BLANK BY POLISHING WITH AN ALKALINE POLISHING LIQUID THAT CONTAINS COLLOIDAL SILICA ABRASIVE GRAINS

(75) Inventors: Kesahiro Koike, Tokyo (JP); Junji Miyagaki, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/182,205

(22) Filed: Jul. 30, 2008

(65) Prior Publication Data

US 2009/0011681 A1 Jan. 8, 2009

Related U.S. Application Data

(62) Division of application No. 10/642,657, filed on Aug. 19, 2003, now Pat. No. 7,413,832.

(30) Foreign Application Priority Data

Aug. 19, 2002 (JP) .............................. 2002/238576

(51) Int. Cl.
G03F 1/00 (2006.01)
G03F 1/14 (2006.01)
B24B 1/00 (2006.01)
B24B 7/24 (2006.01)
B24C 1/08 (2006.01)

(52) U.S. Cl. .................... 430/4; 430/5; 451/36; 451/41
(58) Field of Classification Search ................ 430/4–5; 451/36–37, 41
See application file for complete search history.

(56) References Cited

U.S. PATENT DOCUMENTS

| | | | |
|---|---|---|---|
| 5,080,948 A * | 1/1992 | Morita et al. | 428/846.9 |
| 5,429,730 A * | 7/1995 | Nakamura et al. | 204/192.34 |
| 5,581,345 A * | 12/1996 | Oki et al. | 356/495 |
| 5,868,953 A * | 2/1999 | Maekawa et al. | 216/89 |
| 6,020,109 A * | 2/2000 | Okamoto et al. | 430/311 |
| 6,027,669 A * | 2/2000 | Miura et al. | 252/518.1 |

(Continued)

FOREIGN PATENT DOCUMENTS

| | | |
|---|---|---|
| JP | 61209910 | 9/1986 |
| JP | 1040267 | 2/1989 |
| JP | 01040267 A * | 2/1989 |
| JP | 2001047358 | 2/2001 |
| JP | 2002-131889 | 5/2002 |

OTHER PUBLICATIONS

Grant, Roger and Claire, Grant & Hackh's Chemical Dictionary, Fifth Edition, 1987, McGraw-Hill, Inc., pp. 261 and 487.

*Primary Examiner*—Mark F Huff
*Assistant Examiner*—John Ruggles
(74) *Attorney, Agent, or Firm*—Sughrue Mion, PLLC

(57) ABSTRACT

In a method of producing a glass substrate for a mask blank, a surface of the glass substrate is polished by the use of an alkaline polishing liquid that contains colloidal silica abrasive grains, from which alkali metal is removed to suppress occurrence of an alkali metal gel substance protrusion adhered on the glass substrate. The polishing process may include a surface roughness control step for initially finishing the surface of the glass substrate to a predetermined surface roughness by moving a polishing member and the glass substrate relative to each other under a predetermined pressure. This may be followed by a protrusion suppressing step under a pressure lower than the predetermined pressure, to minimize polishing rate and suppress occurrence of a fine convex protrusion.

10 Claims, 1 Drawing Sheet

U.S. PATENT DOCUMENTS

| | | |
|---|---|---|
| 6,126,518 A | 10/2000 | Jacquinot et al. |
| 6,265,115 B1 | 7/2001 | Berkey et al. |
| 6,277,465 B1 | 8/2001 | Watanabe et al. |
| 6,346,352 B1 * | 2/2002 | Hayden et al. .................. 430/5 |
| 6,626,967 B2 | 9/2003 | Takami et al. |
| 2002/0004173 A1 | 1/2002 | Berkey et al. |
| 2002/0110743 A1 * | 8/2002 | Shoki et al. .................... 430/5 |
| 2003/0228461 A1 | 12/2003 | Yoshikawa et al. |

* cited by examiner

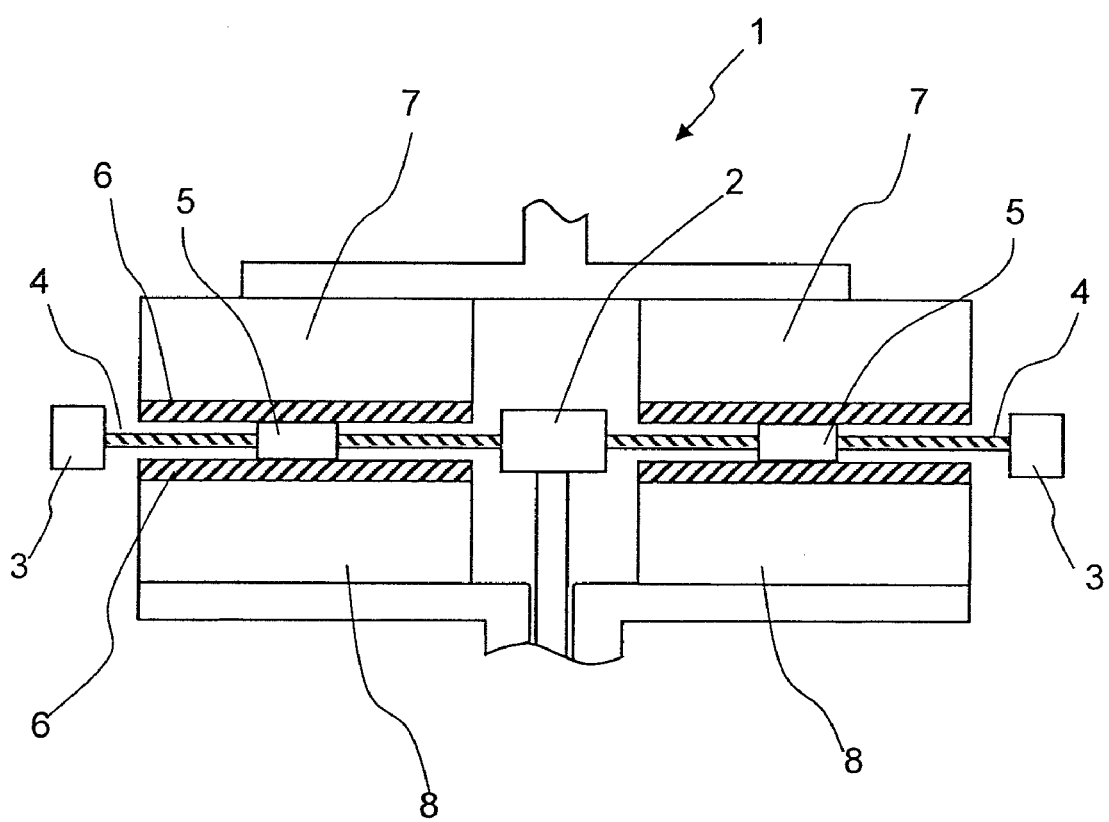

METHOD OF PRODUCING A GLASS SUBSTRATE FOR A MASK BLANK BY POLISHING WITH AN ALKALINE POLISHING LIQUID THAT CONTAINS COLLOIDAL SILICA ABRASIVE GRAINS

This is a divisional of application Ser. No. 10/642,657 filed Aug. 19, 2003, now U.S. Pat. No. 7,413,832 issued Aug. 19, 2008. The entire disclosure(s) of the prior application(s), application number(s) Ser. No. 10/642,657 is hereby incorporated by reference.

This application claims priority to prior Japanese patent application JP 2002-238576, the disclosure of which is incorporated herein by reference.

BACKGROUND OF THE INVENTION

This invention relates to a glass substrate for a mask blank without fine convex surface defects on the surface of the substrate, a method of producing the same, a mask blank using the glass substrate, a method of producing the same, a transfer mask, a method of producing the same, and a method of producing a semiconductor device.

Following the recent development of a higher-density and higher-accuracy VLSI device, a glass substrate for an electronic device, such as a glass substrate for a mask blank, is required to have good flatness and less surface defects. Such demand becomes more and more strict year by year.

In order to reduce the surface roughness of the glass substrate for a mask blank, a precision polishing process is proposed, for example, as disclosed in Japanese Unexamined Patent Publication No. H1-40267 (JP 1-40267 A). The precision polishing process includes a polishing step using a polisher comprising cerium oxide as a main component and a final polishing step using colloidal silica. It is noted here that commercially available colloidal silica has a pH value between 9 and 10.5 in view of the stability. However, when it is diluted, the pH value is lowered. According to the above-mentioned publication, it is therefore preferable to add inorganic alkali, such as NaOH and KOH, or organic alkali, such as amine, to colloidal silica so as to increase the pH value up to 11. Addition of alkali is also advantageous because alkali has an effect of etching the glass and such effect is synergistically exhibited.

The present inventors diligently and thoroughly examined about whether or not the surface of the glass substrate subjected to the final polishing step using colloidal silica increased in pH value as mentioned above satisfies high-level requirement for the flatness and the surface defects as the above-mentioned recent demand. As a result, it has been found out that convex protrusions having a height on the order of several nanometers and a dimension between several tens nanometers to 2000 nanometers are often formed on the surface of the glass substrate subjected to the final polishing step in the above-mentioned manner. The convex protrusions have such a small height and could not be confirmed by traditional visual inspection. The presence of such convex protrusions could not be confirmed without a defect inspection system which has been developed in order to confirm a defect-free surface which meets the recent demand of a high level.

When a thin film is formed on the convex protrusions and a mask blank and a transfer mask are produced, the dimension of the convex protrusions is enlarged. Therefore, even if the substrate itself meets the demand for 0.3 μm defect free, 0.1 μm defect free, and 0.05 μm defect free as a next-generation substrate, the mask blank and the transfer mask using the substrate may be found defective in defect inspection.

In case where a phase shift mask blank or a phase shift mask is produced by the use of the glass substrate with the convex protrusions having a height on the order of several nanometers, change in phase angle due to presence of the convex protrusions becomes greater to cause phase defects as an exposure wavelength of exposure light becomes shorter. As the exposure wavelength becomes shorter, the influence of the convex protrusions becomes greater. The problem of the phase defects is serious in next-generation lithography using an ArF excimer laser, an $F_2$ excimer laser, or an EUV (Extreme Ultra Violet) light source as an exposure light source. For example, it is assumed that the convex protrusions have a height of 5 nm. If the exposure light is ArF having the wavelength of 193 nm, the change in phase angle is 4.6 degrees. If the exposure light is $F_2$ having the wavelength of 157 nm, the change in phase angle is 5.7 degrees. Consideration will be made about the case where an EUV reflective mask blank or an EUV reflective mask is produced by the use of the glass substrate with the convex protrusions having a height on the order of several nanometers. If the convex protrusions have a height of 5 nm, the change in phase angle exceeds 20 degrees when the exposure wavelength is 13.5 nm. This change in phase angle results in increased error and degradation of CD (Critical Dimension) characteristics, which is not a negligible problem.

SUMMARY OF THE INVENTION

It is therefore a first object of this invention to provide a method of producing a glass substrate for a mask blank, in which the rate of occurrence of fine convex surface defects formed on the surface of the substrate is zero or very low even if precision polishing is carried out using abrasive grains comprising colloidal silica and to provide a method of producing a mask blank free from phase defects resulting from fine convex surface defects.

It is a second object of this invention to provide a method of producing a transfer mask without pattern defects resulting from fine convex surface defects on the surface of a substrate and to provide a method of producing a semiconductor device using the transfer mask.

It is a third object of this invention to provide a glass substrate for a mask blank without fine convex surface defects on the surface of the substrate, a mask blank without phase defects resulting from the surface defects, and a transfer mask without pattern defects resulting from the surface defects.

In order to achieve the above-mentioned objects, this invention provides following aspects.

First Aspect

A method of producing a glass substrate for a mask blank, in which the surface of the glass substrate is polished by the use of a polishing liquid containing abrasive grains, wherein:

the abrasive grains comprise colloidal silica abrasive grains produced by hydrolysis of an organosilicon compound.

Second Aspect

A method of producing a glass substrate for a mask blank, in which the surface of the glass substrate is polished by the use of a polishing liquid containing colloidal silica abrasive grains, wherein:

the polishing liquid containing the colloidal silica abrasive grains is neutral.

Third Aspect

A method according to the first or the second aspect, wherein the content of alkali metal in the colloidal silica abrasive grains is 0.1 ppm or less.

Fourth Aspect

A method of producing a glass substrate for a mask blank, comprising a polishing process of polishing the surface of the glass substrate by the use of a polishing liquid containing colloidal silica abrasive grains by moving the polishing member and the glass substrate relative to each other while the polishing member is pressed against the surface of the glass substrate under a predetermined pressure, wherein:

the polishing process comprising a surface roughness control step of polishing the surface of the glass substrate under a polishing pressure to finish the surface of the glass substrate to a predetermined surface roughness and a protrusion suppressing step, following the surface roughness control step, of applying a suppressing pressure lower than the polishing pressure to suppress occurrence of fine convex protrusions.

Fifth Aspect

A method according to the fourth aspect, wherein the pressure applied to the substrate in the protrusion suppressing step is 100 g/cm$^2$ or less.

Sixth Aspect

A method of producing a glass substrate for a mask blank, comprising the step of cleaning the surface of the glass substrate by a cleaning liquid after the surface of the glass substrate is precision-polished by the use of a polishing liquid containing colloidal silica abrasive grains, wherein:

the cleaning liquid has an etching action to the glass substrate and a stronger etching action to impurities, such as metal particles, contained in the polishing liquid and adhered to the glass substrate.

Seventh Aspect

A method according to the sixth aspect, wherein the cleaning step is carried out by the use of the cleaning liquid containing hydrofluoric acid (HF) and/or fluorosilicic acid ($H_2SiF_6$).

Eighth Aspect

A method according to any one of the first through the seventh aspects, wherein the glass substrate is one of a glass substrate for a phase shift mask blank to be exposed by an ArF excimer laser, a glass substrate for a phase shift mask blank to be exposed by an $F_2$ excimer laser, and a glass substrate for a EUV reflective mask blank.

Ninth Aspect

A method of producing a mask blank, in which a thin film for causing an optical change in exposure light is formed on a principal surface of the glass substrate produced by the method according to any one of the first through the eighth aspects.

Tenth Aspect

A method of producing a transfer mask, in which the thin film of the mask blank produced by the method according to the ninth aspect is patterned to form a thin film pattern on the glass substrate.

Eleventh Aspect

A method of producing a semiconductor device, in which a fine pattern is formed on a semiconductor substrate by lithography using the transfer mask produced by the method according to the tenth aspect.

Twelfth Aspect

A glass substrate for a mask blank, wherein: the glass substrate has a principal surface, the principal surface contains Si and O as main components, and the principle surface does not include fine convex surface defects having a height between about 2 nm and about 7 nm.

Thirteenth Aspect

A mask blank comprising the glass substrate according to the twelfth aspect and a thin film formed on the principal surface of the glass substrate to cause an optical change in exposure light.

Fourteenth Aspect

A transfer mask formed by the use of the mask blank according to the thirteenth aspect and having a thin film pattern formed on the glass substrate by patterning the thin film.

BRIEF DESCRIPTION OF THE DRAWINGS

A sole FIGURE shows a double-sided polishing apparatus used in this invention.

DESCRIPTION OF THE PREFERRED EMBODIMENTS

Now, description will be made in detail about a method of producing a glass substrate for a mask blank, a method of producing a mask blank, a method of producing a transfer mask, and a method of producing a semiconductor device. Thereafter, description will be made in detail about a glass substrate for a mask blank, a mask blank, and a transfer mask.

In the following description, fine convex surface defects (hereinafter may simply be called "protrusion defects") represent convex protrusions containing Si and O as main components and having a height on the order of several nanometers and another dimension ranging from several tens of nanometers to 2000 nanometers.

Embodiment 1

In a method of producing a glass substrate for a mask blank according to a first embodiment, when the surface of the glass substrate is polished by the use of a polishing liquid containing abrasive grains, colloidal silica abrasive grains produced by hydrolysis of an organosilicon compound is used as the abrasive grains.

Specifically, high-purity colloidal silica abrasive grains are obtained by preparing, as a raw material, high-purity alkoxysilane from which metal impurities are removed and by carrying out synthesis from the raw material by a sol-gel process. The high-purity colloidal silica abrasive grains synthesized and produced in the above-mentioned manner have a purity as extremely high as 99.99999% and contain very little impurities including alkali metal, such as Na and K, and heavy metal, such as Fe, Al, Mg, and Ti. Therefore, it is possible to suppress occurrence of fine convex surface defects formed on the glass substrate when a gel-like substance by alkali metal or heavy metal impurities are adhered to the glass substrate and serve as a mask to cause a difference in polishing rate or etching.

Embodiment 2

In a method of producing a glass substrate for a mask blank according to a second embodiment, when the surface of the glass substrate is polished by the use of a polishing liquid (slurry) comprising colloidal silica abrasive grains, the polishing liquid comprising the colloidal silica abrasive grains is kept in a neutral range (specifically, the polishing liquid has a pH value between 6 and 8).

The method of producing a glass substrate for a mask blank according to the second embodiment is based on the following finding. At first, the present inventors considered why the convex protrusions are formed in case where the existing colloidal silica slurry has a high pH value (alkaline). From conditions of colloidal silica ($SiO_2$) and an alkali solution, the present inventors presumed the factor causing the convex protrusions as follows. That is, colloidal silica reacts with the alkali solution to produce a gel-like substance. The gel-like substance is adhered to the substrate and condensation occurs with a hydroxyl group as a catalyst. As a consequence, the convex protrusions firmly adhered to the substrate are produced. The present inventors conducted an experiment using the polishing liquid comprising colloidal silica abrasive grains and having a pH value between 6 and 8. As a result, occurrence of the convex protrusions was suppressed (the rate of occurrence was reduced). In this case, the polishing liquid preferably has a pH value between 7 and 7.6 in view of easy handling and stability.

According to the study of the present inventors, $SiO_2$ exhibits single dispersion and is stable in an alkaline atmosphere. In a high pH region (high alkali region), however, dehydration/condensation reaction is caused at a surface layer portion of polishing particles through a hydroxyl group on the surface of the polisher. It is presumed that, via repetition of the above-mentioned reaction, an aggregate of several hundreds nanometers or more is finally produced. The aggregate of the polisher particles caused by the above-mentioned reaction or a part thereof is adhered onto the substrate as a residue (as a gel-like residue) or the substrate is coated with the residue. This brings about the difference in polishing rate, which results in formation of the protrusion defects.

The neutral polishing liquid containing colloidal silica (having a pH value between 6 and 8) is easily obtained because colloidal silica obtained by hydrolysis of an organosilicon compound is stable in a neutral range.

Embodiment 3

In a method of producing a glass substrate for a mask blank according to a third embodiment, the content of alkali metal contained in the colloidal silica abrasive grains in the first or the second embodiment is 0.1 ppm or less. In this case, the content of alkali metal (Na, K) contained in the colloidal silica abrasive grains is preferably 0.08 ppm or less, more preferably 0.05 ppm or less.

Generally, $SIO_2$ particles are present independent of one another because a predetermined electric repulsive force acts between particles. However, if the concentration of an electrolyte (metal ion impurities) in a solvent is increased, the electric repulsive force is lowered. In addition, in the alkaline atmosphere, the solubility of $SIO_2$ is increased as the pH value is higher. It is therefore presumed that the above-mentioned dehydration/condensation reaction will easily occur. From the above, it is supposed that a polisher which has a pH value in a neutral range and a high purity with less electrolyte (metal ions) can suppress aggregation reaction. Practically, in polishing using the polisher of the type, no such defect is observed.

By hydrolysis of an organosilicon compound which can be purified by distillation, high-purity colloidal silica in a neutral range with less alkali metal such as Na and K can be obtained. In case where colloidal silica abrasive grains contain alkali metal (Na, K) impurities in a certain amount or more although colloidal silica itself is neutral, the above-mentioned gel-like substance may be produced. Therefore, it is preferable that the colloidal silica abrasive grains contain alkali metal (Na, K) in an amount as less as possible. Specifically, the content is limited as mentioned above. The average particle size of colloidal silica to be used as the abrasive grains is appropriately selected in dependence upon the surface roughness of the substrate to be obtained. The amount of impurities (for example, Fe, Al, Ca, Mg, Ti, Cu, Ni, and Cr) contained in the colloidal silica is desirably as small as possible.

Embodiment 4

In a method of producing a glass substrate for a mask blank according to a fourth embodiment, the method comprising a polishing process of polishing the surface of the glass substrate by the use of a polishing liquid containing colloidal silica abrasive grains by moving the polishing member and the glass substrate relative to each other while the polishing member is pressed against the surface of the glass substrate under a predetermined pressure, the polishing process comprises a surface roughness control step of polishing the surface of the glass substrate under a polishing pressure to finish the surface of the glass substrate to a desired surface roughness and a protrusion suppressing step, following the surface roughness control step, of applying a suppressing pressure lower than the polishing pressure to suppress occurrence of fine convex protrusions. In the protrusion suppressing step, a polishing rate is minimized so that the height of the fine protrusions formed by the difference in polishing rate between a portion where an adhered substance is adhered to the glass substrate and a remaining portion does not exceed a range corresponding to a phase defect allowable in the glass substrate for a mask blank.

The above-mentioned surface roughness control step is a step to obtain a desired surface roughness required to the glass substrate for a mask blank at an exposure wavelength to be used. Specifically, in each of the glass substrate for a mask blank to be exposed by an ArF excimer laser and the glass substrate for a mask blank to be exposed by an $F_2$ excimer laser, the desired surface roughness is 0.2 nm or less in root-mean-square surface roughness (RMS). In the glass substrate for an EUV reflective mask blank, the desired surface roughness is 0.15 nm or less in root-mean-square surface roughness (RMS).

The mechanism of suppressing occurrence of fine convex protrusions is supposed as follows.

Protrusion defects (fine convex surface defects) are formed by the following mechanism. During polishing, colloidal silica often forms an aggregate (adhered substance) which are left as a residual substance at a particular portion on the surface of an object being polished. Due to presence of the residual substance, polishing at the particular portion is inhibited. As a result, a residue (fine convex surface defects) is produced.

Production of the residue by the above-mentioned phenomenon takes place in a time period of about 2-5 seconds according to an experiment. It is supposed that the residue is produced if the aggregate is retained at one position for the above-mentioned time period. It is therefore presumed that, by carrying out a polishing sequence under a low load to thereby decrease the polishing amount per second (polishing rate), the step height of the protrusions is lowered and the occurrence of protrusion defects can be suppressed.

Occurrence of fine convex surface defects due to the residual substance is not caused in the surface roughness control step of finishing the substrate to a desired surface roughness but is caused after the surface roughness control step, i.e., immediately before the end of the polishing process. In view of the above, occurrence of fine convex protrusions can be suppressed by the protrusion suppressing step following the surface roughness control step. In the protrusion suppressing step, the pressure applied from a polishing member to the substrate is controlled to minimize a polishing rate so that the height of the fine protrusions formed by the difference in polishing rate between a portion where an adhered substance is adhered to the glass substrate and a remaining portion does not exceed a range corresponding to a phase defect allowable in the glass substrate for a mask blank.

The polishing rate in the protrusion suppressing step is preferably 0.12 μm/min or less, more preferably 0.04 μm/min or less, further preferably 0.01 μm/min or less.

For example, the polishing member is a polishing surface table provided with a polishing pad adhered thereto in case where the principal surface of the glass substrate for a mask blank is polished. In case where an end face of the glass substrate is polished, the polishing member may be a tool substantially similar in shape to the end face and provided with a polishing pad attached thereto or a polishing brush.

Embodiment 5

In a method of producing a glass substrate for a mask blank according to a fifth embodiment, the pressure applied from the polishing member to the substrate during the protrusion suppressing step in the fourth embodiment is 100 g/cm$^2$ or less. By adjusting the pressure to the substrate in the protrusion suppressing step, i.e., immediately before the end of the final polishing step (immediately before the polishing member is stopped) to 100 g/cm$^2$, the rate of occurrence of fine convex surface defects can be decreased. The above-mentioned pressure is preferably 50 g/cm$^2$ or less, more preferably 25 g/cm$^2$ or less, further preferably 0 g/cm$^2$.

The colloidal silica abrasive grains may be neutral or alkaline.

Even with the alkali colloidal silica abrasive grains used in the past, the protrusion defects can be suppressed if the polishing sequence immediately before the end of the polishing process is carried out under a low load.

By lowering the pressure or the load applied to the substrate in the protrusion suppressing step, i.e., immediately before the end of the final polishing step, another merit is also achieved. That is, in case where the polishing member is a polishing pad, it is possible to prevent "edge roll off" due to sinking of the polishing pad at a peripheral edge of the glass substrate (application of a greater pressure at the peripheral edge as compared with a center area) and, therefore, the substrate is improved in flatness.

The polishing time under the above-mentioned pressure is 90 seconds or more, preferably 120 seconds or more, more preferably 180 seconds or more. Taking the productivity into consideration, it is preferable that the polishing time is not longer than 360 seconds. Thus, the above-mentioned pressure immediately before the end of the final polishing step is applied for a time period not shorter than a predetermined time. The reason is as follows. Since the final polishing rate is lowered, a longer working time is required for removal of the residual height of the protrusions (for removal of adhered and residual substances) as compared with the case where the polishing is performed at a high polishing rate in the existing technique. Thus, the low load requires the working time not shorter a predetermined time.

Taking the above into consideration, the polishing time is preferably between 180 seconds and 360 seconds in case where the pressure is 100 g/cm$^2$ or less. In case where the pressure is 50 g/cm$^2$ or less, the polishing time is preferably between 120 seconds and 360 seconds. In case where the pressure is 25 g/cm$^2$ or less, the polishing time is preferably between 90 seconds and 360 seconds.

Embodiment 6

According to a sixth embodiment, in a method of producing a glass substrate for a mask blank, comprising the step of cleaning the surface of the glass substrate by a cleaning liquid after the surface of the glass substrate is precision-polished by the use of a polishing liquid containing colloidal silica abrasive grains, the cleaning liquid has an etching action to the glass substrate and a stronger etching action to impurities, such as metal particles, contained in the polishing liquid and adhered to the glass substrate.

The mechanism of forming the protrusion defects is supposed as follows. The above-mentioned impurities contained in colloidal silica are firmly adhered to the substrate. With the impurities as a mask, the substrate is etched by the cleaning liquid having an etching action until the impurities are dissolved. As a result, protrusion defects (fine convex surface defects) are formed. Furthermore, in case where the colloidal silica abrasive grains are alkaline, the above-mentioned gel-like residue is firmly adhered to the substrate. Due to the difference in etching rate by the cleaning liquid between the gel-like residue and the substrate, the substrate is etched so that the protrusion defects are formed. In view of the above, by selecting the condition such that the impurities are dissolved and removed by the cleaning liquid and that the glass substrate is not heavily etched (i.e., by using the cleaning liquid having a stronger etching function to the impurities than to the glass substrate), the height of the protrusion defects can be suppressed.

The cleaning liquid and the concentration of the cleaning liquid are selected depending upon the material of the glass substrate and the impurities to be removed by cleaning.

The colloidal silica abrasive grains may be neutral or alkaline.

Embodiment 7

In a method according to a seventh embodiment, the cleaning liquid in the sixth embodiment contains hydrofluoric acid (HF) and/or fluorosilicic acid ($H_2SiF_6$).

In cleaning the glass substrate after it is precision-polished using the polishing liquid comprising the colloidal silica abrasive grains, alkali cleaning or cleaning by sulfuric acid or hydrochloric acid is generally carried out. However, the colloidal silica abrasive grains may contain a fine amount of impurities, such as Fe, Al, Ca, Mg, Ti, Cu, Ni, and Cr. The impurities adhered onto the surface of the glass substrate after completion of precision polishing cause formation of fine convex surface defects. Occurrence of the fine convex surface defects can not effectively be prevented by directly applying an existing cleaning technique. According to the present inventor's studies, these impurities can effectively be dissolved and removed by cleaning the substrate with a cleaning liquid containing hydrofluoric acid and/or fluorosilicic acid to thereby effectively suppress occurrence of the fine convex surface defects resulting from the impurities. In order to suppress deterioration of the surface roughness due to the cleaning, it is preferable that the concentration of hydrofluoric acid and/or fluorosilicic acid is low.

Thus, by selecting the condition such that the impurities are dissolved and removed by cleaning and that the glass substrate is not heavily etched, the height of the protrusion defects can be suppressed. From the above, the height of the protrusion defects can be suppressed by fluorosilicic acid exhibiting a relatively weak etching action to the glass substrate, a combination of fluorosilicic acid and hydrofluoric acid, or low-concentration hydrofluoric acid. The concentration of the hydrofluoric acid or the fluorosilicic acid is preferably between 0.001% and 0.5%.

Embodiment 8

In a method of producing a glass substrate for a mask blank according to an eighth embodiment, one of the following structures (limitations) a, b, and c is added to any one of the first through the third embodiment so as to obtain a glass substrate for a mask blank, without fine convex surface defects on the surface of the substrate.

(Structure a) In the precision polishing, the pressure applied from the polishing member to the substrate is varied in a plurality of stages. After the desired surface roughness is obtained, pressure applied to the substrate immediately before the end of precision polishing (immediately before the polishing member is stopped) is 100 g/cm$^2$ or less.

(Structure b) After the precision polishing, the substrate is cleaned by the cleaning liquid containing hydrofluoric acid (HF) and/or fluorosilicic acid ($H_2SiF_6$).

(Structure c) In the precision polishing, the pressure applied from the polishing member to the substrate is varied in a plurality of stages. After the desired surface roughness is obtained, pressure applied to the substrate immediately before the end of precision polishing (immediately before the polishing member is stopped) is 100 g/cm$^2$ or less. After the precision polishing, the substrate is cleaned by the cleaning liquid containing hydrofluoric acid and/or fluorosilicic acid.

By adopting each of the above-mentioned structures, occurrence of fine convex surface defects is suppressed. In addition, in case where the polishing member is a polishing pad, edge roll off due to sinking of the polishing pad at a peripheral edge of the glass substrate (application of a greater pressure at the peripheral edge as compared with the center area) is not caused. Consequently, the substrate is improved in flatness.

Embodiment 9

In a method of producing a glass substrate for a mask blank according to a ninth embodiment, the following structure (limitation) d is added to the fourth or the fifth embodiment so as to obtain a glass substrate for a mask blank, without fine convex surface defects on the surface of the substrate.

(Structure d) After the precision polishing, the substrate is cleaned by a cleaning liquid containing hydrofluoric acid (HF) and/or fluorosilicic acid ($H_2SiF_6$).

By adopting the above-mentioned structure, occurrence of fine convex surface defects is further suppressed.

In the foregoing embodiments, the material of the glass substrate is not particularly restricted. As a material of the glass substrate, use may be made of, for example, synthetic quartz glass, borosilicate glass, aluminosilicate glass, alumino-borosilicate glass, soda lime glass, and alkali-free glass.

For example, the mask blank in the foregoing embodiments may be a photomask blank, a phase shift mask blank, or an X-ray or EUV reflective mask blank. For example, the mask blank is applicable to an LSI (semiconductor integrated circuit) or an LCD (Liquid Crystal Display).

Embodiment 10

In a method of producing a glass substrate for a mask blank according to a tenth embodiment, the glass substrate in any one of the first through the ninth embodiments is one of a glass substrate for a phase shift mask blank to be exposed by an ArF excimer laser, a glass substrate for a phase shift mask blank to be exposed by an $F_2$ excimer laser, and a glass substrate for an EUV reflective mask blank. As described above, the method according to this embodiment can suppress the change in phase difference (phase defect) resulting from presence of fine convex surface defects. Therefore, the method according to this embodiment is particularly effective for a glass substrate for a phase shift mask blank to be exposed by an ArF excimer laser, a glass substrate for a phase shift mask blank to be exposed by an $F_2$ excimer laser, and a glass substrate for an EUV reflective mask blank, which are used in lithography with a short exposure wavelength.

Embodiment 11

In a method of producing a mask blank according to an eleventh embodiment, a thin film causing an optical change in exposure light is formed on a principal surface of the glass substrate produced by the method according to any one of the first through the tenth embodiments.

As the mask blank is produced by the use of the glass substrate without the fine convex surface defects on the surface of the substrate, it is possible to obtain the mask blank without surface defects such as phase defects on the surface of the mask blank.

Herein, the thin film causing an optical change in exposure light may be a phase shift film (including the case of a multilayer structure) or a light shielding or opaque film (including the case of a multilayer structure), a lamination of the phase shift film and the light shielding film, a halftone film (including the case of a multilayer structure) having a phase shift function and a light shielding function, a reflection film, and an absorber film. Thus, the mask blank referred to herein is used in a broad sense and includes a photomask blank with a light shielding film alone, a phase shift mask blank with a phase shift film or a halftone film, and a reflective mask blank with a reflective film and an absorber film.

Embodiment 12

In a method of producing a transfer mask according to a twelfth embodiment, the thin film of the mask blank produced by the method according to the eleventh embodiment is patterned to form a thin film pattern on the glass substrate.

As the transfer mask is produced by the use of the mask blank which is obtained by the method according to the eleventh embodiment which is free from surface defects, such as phase defects, on the surface of the mask blank, the transfer mask without pattern defects can be obtained.

Embodiment 13

In a method of producing a semiconductor device according to a thirteenth embodiment, a fine pattern is formed on a semiconductor substrate by lithography using the transfer mask produced by the method according to the twelfth embodiment.

As the semiconductor device is produced by lithography using the transfer mask which is obtained by the method according to the twelfth embodiment and which is free from pattern defects on the surface of the transfer mask, the semiconductor device without pattern defects can be obtained.

Embodiment 14

A glass substrate for a mask blank according to a fourteenth embodiment has a principal surface containing Si and O as main components free from fine convex surface defects having a height between about 2 nm and about 7 nm. As the fine convex surface defects causing the phase defects are not present within the principal surface of the glass substrate, a mask blank free from surface defects such as phase defects can be obtained when the thin film is formed on the glass substrate to produce the mask blank.

Embodiment 15

A mask blank according to a fifteenth embodiment comprises a glass substrate according to the fourteenth embodiment and a thin film formed on a principal surface of the glass substrate to cause an optical change in exposure light.

As the mask blank is produced by the use of the glass substrate without fine convex surface defects on the surface of the substrate, the mask blank without surface defects such as phase defects on the surface of the mask blank is obtained.

Embodiment 16

A transfer mask according to a sixteenth embodiment is formed by the use of the mask blank according to the fifteenth embodiment and has a thin film pattern formed on the glass substrate by patterning the thin film of the mask blank.

According to this embodiment, it is possible to obtain the transfer mask free from pattern defects resulting from surface defects such as phase defects of the mask blank.

EXAMPLES

Hereinafter, description will be made of this invention more in detail in conjunction with specific examples.

In the polishing process of each of the specific examples, a double-sided polishing apparatus is used. Referring to the sole FIGURE, the double-sided polishing apparatus 1 of a planetary gear system comprises a sun gear 2, an internal gear 3 disposed outside the sun gear 2 to be concentric therewith, a carrier 4 which is engaged with the sun gear 2 and the internal gear 3 to be rotated and revolved in response to the rotation of the sun gear 2 and the internal gear 3 and which is adapted to hold an object (glass substrate) 5 to be polished, upper and lower surface tables 7 and 8 adapted to clamp the object 5 and provided with polishing pads 6 adhered thereto, respectively, and a polishing liquid supply portion (not shown) for supplying a polishing liquid to an area between the upper and the lower surface tables 7 and 8.

During polishing, the object 5 held by the carrier 4 is clamped between the upper and the lower surface tables 7 and 8. While the polishing liquid is supplied to a portion between the object 5 and each of the polishing pads 6 of the upper and the lower surface tables 7 and 8, the carrier 4 is rotated and revolved following the rotation of the sun gear 2 and the internal gear 3. Thus, upper and lower surfaces of the object 5 are simultaneously polished.

The double-sided polishing apparatus 1 is connected to an operation control portion (not shown) for setting and controlling the rotation speed and the rotation time of each of the sun gear 2, the internal gear 43, the upper surface table 7, and the lower surface table 8 and a load sequence (polishing time and working load). In accordance with a preselected rotation speed and a preselected rotation time of each of the sun gear 2, the internal gear 43, the upper surface table 7, and the lower surface table 8 and a preselected working load, the object 5 is polished.

Example 1

This example is a specific example of the method of producing a glass substrate for a mask blank according to the second embodiment (the polishing liquid is neutral). This example comprises the following steps.

1) Rough Polishing Step

Preparation was made of synthetic quartz glass substrates (152.4 mm×152.4 mm) after subjected to chamfering at their end faces and lapping by a double-sided lapping apparatus. The glass substrates, 10 in number, were set in the double-sided polishing apparatus and subjected to a rough polishing step in the following polishing condition. The similar step was repeatedly carried out to polish the glass substrates, 100 in total, 10 in a single step. The working load and the polishing time were appropriately adjusted.

Polishing Solution: cerium oxide (average particle size: 2-3 µm)+water

Polishing Pad: hard polisher (urethane pad)

After completion of the rough polishing step, the glass substrates were dipped and cleaned in a cleaning tank (applied with an ultrasonic wave) in order to remove abrasive grains adhered to the glass substrates.

2) Precision Polishing Step

The glass substrates, 10 in number, were set in the double-sided polishing apparatus and subjected to a precision polishing step in the following polishing condition. The similar step was repeatedly carried out to polish the glass substrates, 100 in total, 10 in a single step. The working load and the polishing time were appropriately adjusted.

Polishing Liquid: cerium oxide (average particle size: 1 µm)+water

Polishing Pad: soft polisher (suede type)

After completion of the precision polishing step, the glass substrates were dipped and cleaned in a cleaning tank (applied with an ultrasonic wave) in order to remove abrasive grains adhered to the glass substrates.

3) Ultrahigh Precision Polishing Step

The glass substrates, 10 in number, were set in the double-sided polishing apparatus and subjected to an ultrahigh precision polishing step in the following polishing condition. The similar step was repeatedly carried out to polish the glass substrates, 100 in total, 10 in a single step. The working load and the polishing time were appropriately adjusted so as to achieve a desired surface roughness required for a glass substrate used in a phase shift mask blank. Specifically, the desired surface roughness was 0.2 nm or less in root-mean-square surface roughness RMS. Herein, the working pressure upon the glass substrate immediately before the end of the ultrahigh precision polishing step (i.e., after lapse of the polishing time required to achieve the desired surface roughness and immediately before stop of rotation of the polishing surface table) was 144 g/cm$^2$ and the polishing time under the working pressure was 90 seconds.

Polishing Liquid: neutral (pH 7-7.6) colloidal silica (average particle size: 30-200 nm)+water Polishing Pad: ultrasoft polisher (suede type)

After completion of the ultrahigh precision polishing step, the glass substrates were dipped and cleaned in a cleaning tank (applied with an ultrasonic wave) filled with a cleaning liquid containing an alkali aqueous solution in order to remove abrasive grains adhered to the glass substrates.

The principal surface of each glass substrate thus obtained was examined by a defect inspection system comprising laser interference confocal optics to detect fine convex surface defects having a height on the order of several nanometers (about 2 nm to about 7 nm). As a result, no such surface defects were confirmed and the rate of occurrence of the fine convex surface defects was 0% (0 in 100 glass substrates). Thus, by the use of the neutral colloidal silica abrasive grains, it is possible to suppress production of a gel-like substance and to suppress the rate of occurrence of fine convex surface defects to 0%. It is noted here that, when the pH value after polishing is in a neutral range between 6 and 8, the similar effect was obtained.

Examples 2-1, 2-2, 2-3

These examples are specific examples of the method of producing a glass substrate for a mask blank according to the fourth and the fifth embodiments (working load (pressure) in the protrusion suppressing step and the polishing time). In these examples, glass substrates for a mask blank were produced in the manner similar to Example 1 except the following. Specifically, as the polishing liquid comprising colloidal silica used in the ultrahigh precision polishing step in Example 1, alkali colloidal silica having a pH value of 10.2 was used. In Example 2-1, the working pressure immediately before the end of the ultrahigh precision polishing step (immediately before stop of rotation of the polishing surface table) was 20 g/cm$^2$ and the polishing time under the working pressure was 90 seconds. In Example 2-2, the working pressure was 20 g/cm$^2$ and the polishing time under the working pressure was 120 seconds. In Example 2-3, the working pressure was 20 g/cm$^2$ and the polishing time under the working pressure was 180 seconds. In Example 2-4, the working pressure was 43 g/cm$^2$ and the polishing time under the working pressure was 90 seconds. In Example 2-5, the working pressure was 43 g/cm$^2$ and the polishing time under the working pressure was 120 seconds. In Example 2-6, the working pressure was 20 g/cm$^2$ and the polishing time under the working pressure was 180 seconds. In Example 2-7, the working pressure was 87 g/cm$^2$ and the polishing time under the working pressure was 90 seconds. In Example 2-8, the working pressure was 87 g/cm$^2$ and the polishing time under the working pressure was 120 seconds. In Example 2-9, the working pressure was 87 g/cm$^2$ and the polishing time under the working pressure was 180 seconds.

The principal surface of each glass substrate thus obtained was examined by a defect inspection system comprising laser interference confocal optics to detect fine convex surface defects having a height on the order of several nanometers (about 2 nm to about 7 nm). As a result, the zero defect rate (i.e., no surface defect was confirmed) was 5% in Example 2-1, 3% in Example 2-2, 1% in Example 2-3, 7% in Example 2-4, 3% in Example 2-5, 2% in Example 2-6, 10% in Example 2-7, 6% in Example 2-8, and 3% in Example 2-9. Thus, by carrying out the polishing sequence immediately before the end of the ultrahigh precision polishing step under the pressure of 100 g/cm$^2$ or less to decrease the polished amount, the step height of the protrusions resulting from the colloidal silica aggregates can be lowered. In this manner, the rate of occurrence of the fine convex surface defects can be suppressed to 0% or a value smaller than that of the comparative examples which will later be described. Herein, in case where the pressure immediately before the end of the ultrahigh precision polishing step using the colloidal silica abrasive grains is 100 g/cm$^2$ and the polishing time under the pressure is 120 seconds or more, the rate of occurrence of the fine convex surface defects can be suppressed to 0%.

Examples 3-1, 3-2

These examples are specific examples of the method of producing a glass substrate for a mask blank according to the sixth and the seventh embodiments. In these examples, glass substrates for a mask blank were produced in the manner similar to Example 1 except the following. Specifically, as the polishing liquid comprising colloidal silica used in the ultrahigh precision polishing step in Example 1, alkali colloidal silica having a pH value of 10.2 was used. After the ultrahigh precision polishing step, the glass substrates were dipped and cleaned in a cleaning tank (applied with an ultrasonic wave) in order to remove the abrasive grains adhered to the glass substrates. In Example 3-1, the cleaning tank was filled with a cleaning liquid containing fluorosilicic acid (0.2%). In Example 3-2, the cleaning tank was filled with a cleaning liquid containing fluorosilicic acid (0.2%) and low-concentration hydrofluoric acid (0.05%).

The principal surface of each glass substrate thus obtained was examined by a defect inspection system comprising laser interference confocal optics to detect fine convex surface defects having a height on the order of several nanometers (about 2 nm to about 7 nm). As a result, the zero defect ratio (i.e., no surface defect was confirmed) was 16% in Example 3-1 and 10% in Example 3-2. Thus, by the use of the cleaning liquid containing hydrofluoric acid and/or fluorosilicic acid in cleaning after precision polishing using the polishing liquid comprising colloidal silica, the impurities firmly adhered to the glass substrate are dissolved and removed while the etching action to the glass substrate becomes relatively weak. As a result, occurrence of the fine convex surface defects can be suppressed as compared with the comparative examples which will later be described.

Example 4

This example is a specific example of the method of producing a glass substrate for a mask blank according to an eighth embodiment. In this example, glass substrates for a mask blank were produced in the manner similar to Example 1 except the following. The working load immediately before the end of the ultrahigh precision polishing step (immediately before stop of rotation of the polishing surface table) was 20 g/cm$^2$ and the polishing time under the working pressure was 90 seconds. After the ultrahigh precision polishing step, the glass substrates were dipped and cleaned in a cleaning tank (applied with an ultrasonic wave) filled with a cleaning liquid containing fluorosilicic acid in order to remove the abrasive grains adhered to the glass substrates.

The principal surface of each glass substrate thus obtained was examined by a defect inspection system comprising laser interference confocal optics to detect fine convex surface defects having a height on the order of several nanometers (about 2 nm to about 7 nm). As a result, the rate of occurrence of the surface defects was 0% (0 substrates in 100 substrates). As compared with the glass substrates obtained in Examples 1 to 3, the glass substrates were excellent in end profile with less edge roll off. The production yield of the substrates having a flatness of 0.5 μm or less was improved by 20% as compared with Examples 1 to 3.

Example 5

This example is a specific example of the method of producing a glass substrate for a mask blank according to the ninth embodiment. In this example, glass substrates were produced in the manner similar to Example 2-1 except the following. After the ultrahigh precision polishing step, the glass substrates were dipped and cleaned in a cleaning tank (applied with an ultrasonic wave) filled with a cleaning liquid containing fluorosilicic acid in order to remove the abrasive grains adhered to the glass substrates.

The principal surface of each glass substrate thus obtained was examined by a defect inspection system comprising laser interference confocal optics to detect fine convex surface defects having a height on the order of several nanometers (about 2 nm to about 7 nm). As a result, the rate of occurrence of the surface defects was 3% (3 substrates in 100 substrates). As compared with the surface defect rate of 5% in Example 2-1, the rate was reduced by 2%.

Example 6

This example is a specific example of the method of producing a glass substrate for a mask blank according to the first and the third embodiments. In this example, glass substrates were produced in the manner similar to Example 1 except that the polishing liquid used in the ultrahigh precision polishing step is as follows.

Polishing Liquid: high-purity colloidal silica (average particle size: 30-100 nm)+water Herein, the high-purity colloidal silica was produced by hydrolysis of the organic silicon and synthesized by the sol-gel process using, as a material, high-purity alkoxysilane from which metal impurities are removed. The purity was 99.99999%. The content of alkali metal (Na, K) contained in the colloidal silica abrasive grains was 0.1 ppm or less.

The principal surface of each glass substrate thus obtained was examined by a defect inspection system comprising laser interference confocal optics to detect fine convex surface defects having a height on the order of several nanometers (about 2 nm to about 7 nm). As a result, no such surface defect was confirmed and the rate of occurrence of fine convex surface defects was 0% (0 in 100).

Comparative Examples 1, 2

In these comparative examples, glass substrates for a mask blank were produced in the manner similar to Example 1 except the following. As the polishing liquid comprising colloidal silica used in the ultrahigh precision polishing step, the polishing liquid having a pH value of 10.2 was used in Comparative Example 1 and the polishing liquid having a pH value of 9 was used in Comparative Example 2. The principal surface of each glass substrate thus obtained was examined by a defect inspection system comprising laser interference confocal optics to detect fine convex surface defects having a height on the order of several nanometers (about 2 nm to about 7 nm). As a result, in Comparative Example 1, the average count of surface defects of was about 100 per substrate. The ratio of occurrence of fine convex surface defects was 100% (100 substrates in 100 substrates). In Comparative Example 2, the average count of surface defects ranged from several to several tens per substrate. The ratio of occurrence of fine convex surface defects was 22% (22 substrates in 100 substrates).

Comparative Example 3

In this comparative example, glass substrates for a mask blank were produced in the manner similar to Example 1 except the following. As the polishing liquid used in the ultrahigh precision polishing step, use was made of a polishing liquid containing colloidal silica with hydrochloric acid or sulfuric acid added thereto and having a pH value in an acidic range, i.e., between 3 and 4. In this case, the stability of the polisher was inferior and irregularities were formed on the principal surface of the glass substrate so that the surface roughness was increased. The glass substrates thus obtained did not meet the requirement as a glass substrate for a phase shift mask blank.

The fine convex surface defects confirmed in Examples 2 and 3 and Comparative Examples 1 and 2 were analyzed by an EPMA (Electron Probe (X-ray) Micro Analyzer). As a result, it has been confirmed that the surface defects contained Si and O as main components.

Furthermore, by the use of the glass substrates for a mask blank which were produced in Examples 1 to 6 and which were free from fine convex surface defects and the glass substrates which were produced in Comparative Example 1 and which had the fine convex surface defects, phase shift mask blanks were produced. Specifically, a halftone film comprising a molybdenum silicide film was formed by sputtering on one principal surface of each of the glass substrates. The phase shift mask blanks thus produced were subjected to defect inspection. As a result, in the phase shift mask blanks produced by the use of the glass substrates obtained in Examples 1 to 6, no convex surface defects were observed. On the other hand, in the phase shift mask blanks produced by the use of the glass substrates which were obtained in Comparative Example 1) and which had the fine convex surface defects, convex surface defects were confirmed on the surface of the halftone film.

By the use of the phase shift mask blanks without fine convex surface defects and the phase shift mask blanks with the fine convex surface defects, phase shift masks were produced. Specifically, a resist film was formed on each of the phase shift mask blanks. Then, the resist film was patterned to form a resist pattern. Thereafter, with the resist pattern used as a mask, the halftone film was selectively etched and removed by dry etching. Then, the resist pattern was removed. Thus, the phase shift mask with a halftone film pattern formed on the glass substrate was produced.

For each of the phase shift masks thus produced, the surface defect was inspected. As a result, in the phase shift masks produced by the use of the glass substrates in Examples 1 to 6 without fine convex surface defects, no phase defect was confirmed. On the other hand, in the phase shift masks produced by the use of the glass substrates in Comparative Example 1, convex surface defects were confirmed at a boundary between the surface of the glass substrate and the halftone film pattern and result in phase defects.

Furthermore, by the use of the phase shift masks with the phase defects, fine patterns were formed on semiconductor substrates by lithography using an exposure apparatus. As a result, pattern defects resulting from the phase defects of the phase shift mask were confirmed. On the other hand, in case where fine patterns were formed on semiconductor substrates by the use of the phase shift masks without the phase defects, no pattern defect was observed.

On each of the glass substrates produced in Examples 1 to 6 and Comparative Example 1, a lamination of 40 periods of Mo films and Si films was formed to obtain a multilayer reflective film. Furthermore, on the multilayer reflective film, an absorber film comprising a TaBN film was formed to obtain an EUV reflective mask blank. Furthermore, a resist film was formed on the TaBN film and patterned to form a resist pattern. With the resist pattern used as a mask, the TaBN film was selectively etched and removed by dry etching. Then, the resist pattern was removed. Thus, an EUV reflective mask was produced.

In the manner similar to that mentioned above, inspection was made of the surface defects of the EUV reflective mask blanks, the phase defects of the EUV reflective masks, the pattern defects of the fine patterns formed on the semiconductor substrates by lithography using the EUV reflective masks. As a result, no such defects were observed in case where the glass substrates in Examples 1 to 6 were used. On the other hand, in case where the glass substrates in Comparative Example 1 were used, the above-mentioned defects were confirmed in the EUV reflective mask blanks, the EUV reflective masks, and the semiconductor devices.

In Examples mentioned above, description has been made of the case where polishing was carried out by the use of the double-sided polishing apparatus of a planetary gear system. Not being limited thereto, precision polishing using the polishing liquid comprising colloidal silica may be performed by the use of a double-sided polishing apparatus of a different type or a single-sided polishing apparatus. In either event, the similar effect is obtained.

As thus far been described, according to this invention, a method of producing a glass substrate for a mask blank in which the surface of the glass substrate is polished by the use of a polishing liquid containing abrasive grains is characterized as follows. The abrasive grains comprise colloidal silica abrasive grains produced by hydrolysis of an organosilicon compound. The polishing liquid containing colloidal silica abrasive grains is neutral. The polishing process is carried out by changing pressure applied from a polishing member to the substrate in a plurality of stages and comprises a surface roughness control step in which the surface of the glass substrate is finished to a desired surface roughness under a predetermined pressure and a protrusion suppressing step, following the surface roughness control step, in which the occurrence of fine convex protrusions is suppressed by applying a pressure smaller than the predetermined pressure. The polishing liquid comprising the colloidal silica abrasive grains has a pH value between 6 and 8. The cleaning liquid used in cleaning the substrate after precision polishing using the polishing liquid containing the colloidal silica abrasive grains has an etching action to the glass substrate for a mask blank and has a stronger etching action to the impurities, such as metal particles, contained in the polishing liquid and adhered to the glass substrate. Thus, it is possible to provide a glass substrate for a mask blank without fine convex surface defects on the surface of the substrate even if precision polishing is carried out by the use of the colloidal silica abrasive grains and to provide a method of producing the same.

By producing a mask blank using the glass substrate for a mask blank without fine convex surface defects on the surface of the substrate, it is possible to provide a mask blank free from phase defects and to provide a method of producing the same.

A transfer mask free from pattern defects is obtained by producing the transfer mask using the mask blank free from the phase defects. Furthermore, by forming a fine pattern on the semiconductor substrate by lithography using the transfer mask without pattern defects, a semiconductor device without pattern defects can be produced.

While this invention has thus far been disclosed in conjunction with several embodiments thereof, it will be readily possible for those skilled in the art to put this invention into practice in various other manners. In the foregoing embodiments, the rough polishing step and the precision polishing step using the polishing solution containing cerium oxide abrasive grains are carried out prior to the polishing step (ultrahigh precision polishing step) using the polishing solution containing colloidal silica abrasive grains. However, this invention is not limited thereto. As far as the glass substrate before subjected to the polishing step using the polishing solution containing colloidal silica abrasive grains is sufficiently flat and smooth, the rough polishing step and/or the precision polishing step using the cerium oxide abrasive grains may not be carried out. Furthermore, in case where the rough polishing step and the precision polishing step are carried out, other types of abrasive grains, such as zirconium oxide or aluminum oxide, may be used instead of cerium oxide.

What is claimed is:

1. A method of producing a glass substrate for a mask blank, in which a surface of the glass substrate is polished by the use of a polishing liquid containing abrasive grains, wherein:
   the polishing liquid comprises colloidal silica abrasive grains,
   the polishing liquid is alkaline,
   a content of the alkali metal in the colloidal silica abrasive grains is 0.1 ppm or less, the glass substrate is one of a glass substrate for a phase shift mask blank to be exposed by an ArF excimer laser, a glass substrate for a phase shift mask blank to be exposed by an $F_2$ excimer laser, and a glass substrate for a EUV reflective mask blank, and
   the surface of the glass substrate is polished so as to have a surface roughness required in an exposure wavelength to be used so that a height of a protrusion generated on the surface of the glass substrate during polishing falls within a phase defect range that is allowable for the exposure wavelength.

2. A method according to claim 1, comprising:
   a surface roughness control step of finishing the surface of the glass substrate to a surface roughness required in an exposure wavelength to be used by using the polishing liquid comprising colloidal silica abrasive grains and moving a polishing member and the glass substrate relative to each other while the polishing member is pressed against the surface of the glass substrate under a predetermined pressure, and
   a protrusion suppressing step, following the surface roughness control step, of using the polishing liquid comprising colloidal silica abrasive grains, controlling to a pressure lower than the predetermined pressure and suppressing the occurrence of the protrusion by moving the polishing member and the glass substrate relative to each other.

3. A method according to claim 2, wherein:
   the pressure applied to the substrate in the protrusion suppressing step is 100 g/cm$^2$ or less.

4. A method according to claim 2, wherein:
   in the surface roughness control step, the surface of the glass substrate is finished so as to have the surface roughness of 0.2 nm or less in root-mean-square surface roughness (RMS).

5. A method according to claim 1, comprising:
   a defect detecting step of detecting a defect of the surface by using a defect inspection system comprising laser interference confocal optics after the polishing process, wherein the protrusion is detected in the defect detecting step, the protrusion contains Si and O as main components, and the protrusion has a height causing a phase defect.

6. A method according to claim 5, wherein:

the glass substrate having a protrusion height that falls within a range between substantially 2 nm and 7 nm is selected in the defect detecting step.

7. A method according to claim 1, comprising:

cleaning the surface of the glass substrate by a cleaning liquid after polishing, wherein the cleaning liquid has an etching action to the glass substrate and a stronger etching action to impurities which are contained in the polishing liquid and adhered to the glass substrate.

8. A method according to claim 7, wherein:

the cleaning liquid contains at least one of hydrofluoric acid (HF) and fluorosilicic acid ($H_2SiF_6$).

9. A method of producing the mask blank, wherein:

a thin film is formed on a principal surface of the glass substrate produced by the method according to claim 1.

10. A method of producing a transfer mask, wherein:

the thin film of the mask blank produced by the method according to claim 9 is patterned to form a thin film pattern on the glass substrate.

* * * * *